United States Patent [19]
Biglano

[11] 3,714,309
[45] Jan. 30, 1973

[54] MANUFACTURE OF PLASTIC FILM
[75] Inventor: Bernard Keith Biglano, Radcliffe, Lancashire, England
[73] Assignee: General Engineering Co., Ltd.
[22] Filed: Aug. 11, 1970
[21] Appl. No.: 63,019

Related U.S. Application Data
[63] Continuation of Ser. No. 738,008, June 18, 1968.

[52] U.S. Cl. .................... 264/89, 264/95, 264/167, 264/210 R, 264/237, 264/289, 425/72
[51] Int. Cl. ........ B29c 17/04, B29c 25/00, B29d 7/24
[58] Field of Search ........... 264/95, 209, 89, 90, 289, 264/210 R, 264/237, 167; 425/72

[56] References Cited

UNITED STATES PATENTS

| | | | |
|---|---|---|---|
| 2,966,700 | 1/1961 | Dyer et al. | 264/95 |
| 3,092,874 | 6/1963 | Fallwell | 264/95 |
| 2,433,937 | 1/1948 | Tornberg | 264/95 |
| 3,090,998 | 5/1963 | Heisterkamp et al. | 264/95 |

Primary Examiner—Robert F. White
Assistant Examiner—Jeffery R. Thurlow
Attorney—Bierman and Bierman

[57] ABSTRACT

A method of forming an extruded tube of plastic material comprising extruding the material in a semimolten state as a tubular film, having a wall of greater thickness than that of the finished tube, locating a former within the tube near the extrusion point, passing the film over the face of the former in close proximity thereto, at least part of the freeze zone of the film being between the plane of the maximum diameter of the former and the downstream end thereof, directing a high velocity stream of air against the inner face of said film at said former at a velocity at least as high as the point of resonance at said freeze zone to provide a skin sufficient to prevent actual contact between the film and former. The diameter of the tube being extruded can be varied by varying the diameter of the former. In order to obtain still greater speeds of extrusion, external cooling can be applied.

15 Claims, 1 Drawing Figure

BERNARD K. BIGLAND
INVENTOR by Bierman & Bierman
ATTORNEYS

MANUFACTURE OF PLASTIC FILM

This application is a streamline continuation application of my co-pending application Ser. No. 738,008, now abandoned filed June 18, 1968 which is a continuation-in-part of co-pending application Ser. No. 621,080, now abandoned filed Dec. 7, 1966 which, in turn, is a continuation-in-part of co-pending application Ser. No. 318,039, now abandoned filed Oct. 22, 1963 and entitled "MANUFACTURE OF PLASTIC FILM."

This invention relates to the manufacture of plastic film such as is now extensively used for packaging and made from polyethylene, polystyrene or polyvinylchloride and like thermoplastic materials. More particularly, the invention relates to the extrusion of a film in tubular form and to a method whereby quite thin-walled tubes of uniform dimensions are obtained.

A known system of manufacture of such film consists in the use of a plastic extrusion machine to feed material to a die head which may be arranged to deliver the film as a tube, either horizontally or vertically (up or down). Such extruded tube is thicker than the intended film thickness and the next stage is to pass the tube through the nip of feed rollers at a suitable distance from the die head and to inflate the length of tube by air pressure within the closed volume between the die head and nip rollers to produce an expansion of diameter of the tube and bring the tube wall to the required film thickness.

Such process involves several problems and in particular as regards temperature and control of the "blown" tube size, both of which are factors determining the accoracy of film gauge and speed of production. The extruded tube must be hot as it emerges from the die while it must thereafter be cooled to condition the plastic for blowing and to control the resultant stretch and its uniformity.

In fact, the speed at which "blown" film can be produced is largely determined by the initial temperature of extrusion and the available effective degree of cooling. Furthermore, the quality of film produced, particularly as regards clarity, is a direct function of the temperature which should be as high as possible, while the blown length is determined by the effectiveness of cooling, and control of diameter becomes increasingly difficult as such length is increased. Also, problems arise from distortion of the blown shape if the force of external air cooling is unduly increased. All the above problems result in limiting production speed or deterioration in film quality.

In another method of production the extruded tube is expanded over a former of known fixed diameter but such system has necessitated the use of liquid as a coolant and lubricant to prevent sticking to the former and the use of such liquids in contact with the film brings its own special problems, since they are difficult to remove from the film and may destroy the quality of the film through spot cooling.

Still another prior-art process provides a plate in the bubble dividing it into two pressure zones. The film is stretched to the desired diameter in the high-pressure zone (the one adjacent the extruder) and passes over the plate and is then rolled up. The freeze zone of the plastic tubing is located below the former as the diameter is set prior to passing thereover. This process localizes the high-pressure volume and permits operation at higher speeds than heretofore known. However, it presents most of the same disadvantages as the old methods of extrusion in that there is poor control of thickness due to the inevitable pressure variations. Furthermore, it is difficult to vary the size of the diameter of the tubing being extruded as it is necessary to adjust and rebalance the volume of air contained within the extrusion bubble. The entire process is very tricky since the volume of air entering the bubble must exactly equal that leaving the bubble. If this is not so, the bubble will begin to expand (if less air leaves than enters) or contract (if more air leaves than enters). In the latter case, it will very soon touch the plate and the film will break or be marred. In the former case, the volume will build up and the bubble will increase in size thus enlarging the diameter beyond that intended. Even slight variations in the input-output relationship will of course cause corresponding variations in the diameter of the finished tube. Obviously, if this condition is permitted to continue the bubble will burst.

The present invention is based upon the appreciation of the aforesaid problems and the conception of an entirely new method of operation of an apparatus for producing plastic film avoiding such problems with the objects of increasing the speed of production and improving the quality of the film.

In the prior art, the thinning of the wall is obtained by air pressure within the tube while in the plastic state, and the tube is set by cold fluid before it reaches the former. No thinning or stretching can take place after it has reached the former.

According to the present invention, a method of forming an extruded tube of a plastic material such as polyethylene includes the steps of extruding the material as a tubular film having walls of greater thickness than the required finished wall thickness and passing said tube over a former while providing an air skin on the outer surface of said former, to determine the stretching of the tubular film.

According to a further feature of the present invention a method of forming an extruded tube includes the further step of applying cooling air against the outside of said tubular film in the region of said former.

According to a still further feature of the present invention, a method of forming an extruded tube includes the further step of determining the diameter of the extruded tube by varying the effective size of said former by using an expandable former.

Also according to the invention is apparatus for forming an extruded tube of a plastic material such as polyethylene which comprises means for extruding the material as a tubular film having walls of greater thickness than the required finished wall thickness, a former, means for passing said tubular film over said former, and means for providing an air skin on the outer surface of said former.

In practicing the present invention, a tube is extruded in the plastic state and it is moved over a former and to a roller on which the completed tube is wound. The semiplastic tube passes over the face of the former. A stream of cool air, all around the former, is directed against the outer wall of the tube and impinges on that part of the tube which is adjacent to the area of the former over which the tube passes. At that area the tube is separated from the former only by a skin of air.

At said area there is the setting of the plastic and the simultaneous stretching of the tube, whereby the wall of the tube is thinned out uniformly during the continuous movement of the tube.

The essence of the present invention is the discovery that by locating the freeze zone between the maximum diameter of the former and the downstream end thereof certain unexpected advantages can be obtained. The term "freeze line" is recognized in the art. However, more accurately this is a zone rather than a sharp line. Therefore the term "freeze zone" as used herein is intended to mean the zone at which crystallization of the original amorphous plastic commences. This can be visually noted by a decrease in clarity or clouding of the film which takes place. The zone is irregular due to corresponding fluctuations in the process conditions. When the film leaves the freeze zone it is dimensionally stable.

By adjusting the various parameters such as air flow, exhaust, rate of extrusion, etc., the freeze zone is adjusted so that at least part of it falls between the maximum diameter of the former and the downstream end thereof.

As a result of this adjustment the diameter of the extruded tube is determined not by the volume of air within the bubble, but rather by the size of the former itself. Because of this, the diameter of the extruded tubing can be varied simply by changing the diameter of the former. There is no necessity to balance pressures and the diameter of the finished tubing is independent of the volume of air passing through the bubble.

In the preferred form of the invention, it has been found advantageous to withdraw air from the bubble by any suitable positive means. The faster air is pumped into and pulled out of the bubble, the faster will the process operate. Of course, the positive extraction of air must take place at a rate substantially equal to the rate of supply of the air into the freeze zone. It is primarily a matter of obtaining sufficiently rapid cooling of the plastic so that it can be run at a higher speed while still maintaining the freeze zone in the locations hereinbefore indicated. There is no critical pressure involved and the volume of the bubble can vary within substantial limits. Therefore the process is easy to operate even by an inexperienced workman.

The invention will now be described by way of example only, with reference to the accompanying drawings which show apparatus according to one embodiment of the invention:

In the drawings:

FIG. 2 is a plan view of the apparatus of FIG. 1; and

FIG. 3 is a side elevation of the apparatus of FIG. 1 in the direction of the arrow A.

Figure 1:
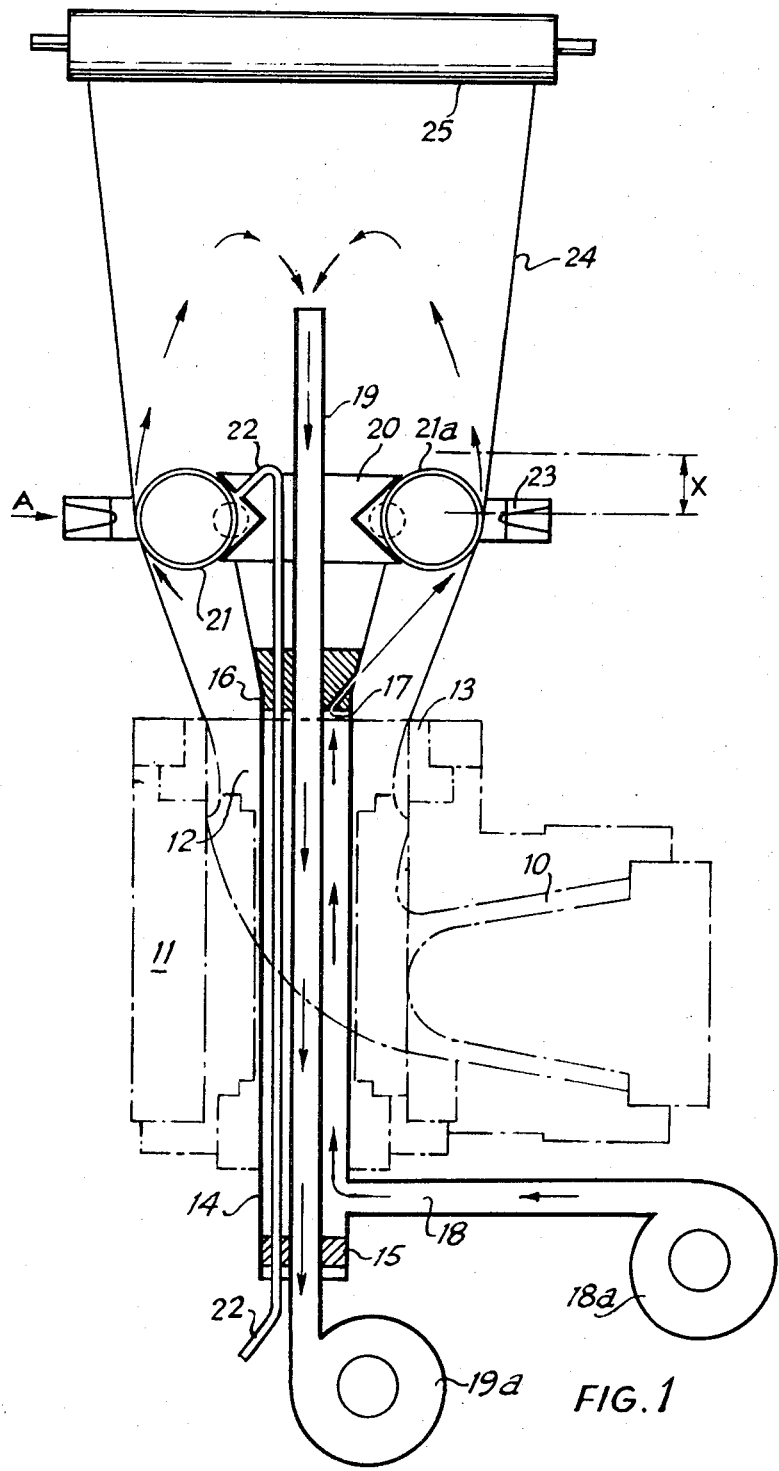
FIG. 1 is a vertical section of the apparatus used at the delivery end of a plastic extrusion machine.

Referring now to the drawings, a continuous feed plastic extrusion machine (not shown) forces a plastic melt through the channel 10 to the die head 11, of which the die itself comprises an inner mandrel 12, and an outer die ring 13. Supporting and passing upwardly through the mandrel 12 is cylindrical tube 14 closed at its ends by plugs 15 and 16. The upper end of the tube 14 is provided with spaced perforations 17 above the mandrel 12 preferably producing jets directed at the periphery of former 21, the lower end of tube 14 is provided with air inlet 18, which is connected to a fan or compressor 18a. A cylindrical tube 19 of somewhat smaller diameter than the tube 14 passes centrally through the plugs 15 and 16, and has an open end above former 21. Adjacent the upper extremity of tube 14, and fixed externally thereto is a circular member 20 of the L-shaped cross-section, which serves to support an inflatable toroidal member 21. A pipe 22 passes from the former 21 and downwardly through the plug 16, tube 14 and plug 15 adjacent the tube 19. The lower end of the pipe 22 is connected to a supply of compressed air via suitable valve means (not shown).

An air cooling ring, generally indicated at 23, is positioned outside and opposite the former 21, and is spaced somewhat therefrom, with its outlets directed thereto.

FIG. 1 shows the apparatus in use extruding a thin-walled cylindrical plastic tube 24 which passes between nip rollers, generally indicated at 25, to suitable take-up mechanism (not shown).

The purpose and function of the various elements of the apparatus will be apparent from the following description of the operation of the machine.

On starting the machine, the supplies of air to the cooling ring 23, inlet 18, and pipe 22, are shut off, and the former 21 is in the deflated state indicated by dotted lines on FIG. 1. The extrusion machine feed is started, and a comparatively thick-walled plastic tube of greater diameter than the diameter of the deflated former 21 is extruded from the die head 11. The plastic tube is passed upwardly between the air ring 23 and the former 21 and thence through the nip rollers 25 to the take-up mechanism. Compressor 18a is started up and inlet 18 is then opened, and compressed air flows up to the tube 14 and emerges through perforations 17, and thence, as a plurality of air jets directed toward the periphery of former 21, upward between the plastic tube 24 and the former 21, into the volume sealed by the nip rollers 25 and then (preferably under the influence of suction pump 19a) out through the tube 19, as generally indicated by the arrows on FIG. 1. At this stage, a controlled quantity of air is admitted into the pipe 22 causing the former 21 to inflate, thus increasing the diameter of the plastic tube 24, with a consequent thinning of its walls.

The plastic tube 24 flows over the former 21, floating on a skin of air, since the air from the perforations 17 is now flowing between the plastic tube 24 and the former 21 at a high velocity. Velocity is adjusted so that at least part of the freeze zone is between the maximum diameter of former 21 and the upper end 21a thereof. This permits control of the diameter of the tubing by controlling the diameter of former 21.

The minimum velocity can be initially determined by placing a cylinder of polyvinylchloride in position in the apparatus in the same manner in which the tubing would be if it were being extruded. The upper and lower ends of the cylinder are sealed and the pumps are started and the velocity increased to the point of resonance. It has been found empirically that this point of resonance is the minimum velocity necessary for the operation of this process. The maximum velocity is limited only by the speed of flow of the film desired and/or other conditions which are not relevant to the process. Once the minimum velocity is determined as herein set forth, the process is started up with the blowers operating at the minimum velocity. Once the process is going, suitable adjustments are made so that the freeze zone is properly located in accordance with the teachings hereof.

A still further refinement of the determination of proper perameters is adjustment of the flow of air into and out of the bubble to a sufficiently high rate whereby the film is sucked inward slightly as it approaches the former from the extrusion side.

It appears that the essence of the invention is to maintain the freeze zone as set forth herein. The foregoing is another means for assisting in obtaining an optimum value.

The flow of air must be of sufficient velocity to provide a "skin" of fast moving air which carries the film over the former. At the same time, this fast moving stream of air gives increased and improved cooling of the inner surface of the extruded film. As a result of this, the present process is capable of operating at speeds far beyond those heretofore possible.

Moreover, the location of the freeze zone as set forth herein makes the size of the former the determining factor of the diameter of the extruded tubing. Therefore, not only is very accurate control of the ultimate diameter possible, but by provision of an adjustable diameter former, the diameter of the tube can be varied while the process is running without shutting down. In other words, the air inside the extruded tube does not cause the expansion of the tube, but rather the air in the expandable former has this function.

The cooling ring 23 can next be brought into operation and can emit large quantities of air without distorting the plastic tube 24 since the latter is inwardly supported against the air blast by the air skin and the former 21. Thus, more efficient cooling can be effected than has hitherto been possible and as a consequence, the plastic may be extruded at a substantially higher temperature, which allows a greater speed of production, and a better quality of product to be realized.

Furthermore, very rigid control can be maintained during production, as the diameter of the plastic tube 24 may readily be corrected by admitting or releasing a small quantity of air to or from the former 21, as may be necessary.

It will be appreciated that the scope of the invention is in no way limited by the above example, many variations being possible. For example, the former 21 could be inflated by a liquid which could circulate therein to give added cooling. Also, it would be possible to use a mechanically expandable former in place of the inflatable former 21.

Further, the whole apparatus could be modified so as to extrude the thin-walled plastic tube downwardly or horizontally.

In the present process, air entering duct 18 and exiting through openings 17 flows under relatively low pressure and high velocity between former and tube 24. The velocity is such as to form a thin skin of fast-moving air which helps carry the tube over the former and prevents sticking thereto.

In the preferred embodiment, suction pump 19a removes the air from tube 24 above former 21. This permits especially high speed operation. The pump can be omitted if somewhat lower speeds of operation are satisfactory.

While only a single embodiment of the invention has been disclosed, such changes as would be apparent to those having reasonable skill in the art may be made without departing from the scope and spirit thereof. For example, the air jets directed at the circumference of former 21 may be replaced by an annular opening producing a fast-moving stream of air.

These and other changes may be made in this invention and it is not to be limited except by the character of the claims appended hereto.

What is claimed is:

1. A method of forming an extruded tube of plastic material which comprises extruding said material while in a semi-molten state as a tubular film having a wall of greater thickness than that of the finished tube, locating a former having a maximum diameter within said tube adjacent to the point of extrusion, said former having an outer face, the diameter of said former being substantially greater than that of said film at the point of extrusion, said extruded film being of smaller diameter than the former below said center line thereof, at least part of the freeze zone of said film being between the plane of maximum diameter of said former and the downstream end thereof, directing a high velocity stream of air against the inner face of said film at said former at a velocity at least as high as the point of resonance at said freeze zone and at a pressure sufficiently low to prevent the air from substantially expanding the diameter of the extruding tube between the former and the extruder and to provide a skin of air of such thickness that it is sufficient to prevent actual contact between said film and said former, increasing the diameter of said tube by drawing said tube over the former, extracting air out of the downstream side at a rate equal to the rate of supply of said air into said freeze zone, maintaining a controlled pressure at said downstream side of said former to maintain said film in a stabilized tubular form, and cooling said tube by said air at said maximum diameter sufficiently to locate said freeze zone between said diameter and said end.

2. A method according to claim 1 characterized in that a second stream of air of large volume is directed against the outer surface of said film onto a circumferential area of said tube, said stream providing additional cooling of said tube.

3. A method according to claim 1 wherein said tube is stretched between said extrusion and said former prior to the setting of said plastic.

4. A method according to claim 1 wherein said air is extracted under the influence of a pumping means.

5. A method according to claim 1 wherein the maximum diameter of said former is varied during operation of said method whereby corresponding variation in the diameter of said tube is obtained.

6. A method of forming an extruded tube of plastic material which comprises extruding said material while in a semi-molten state as a tubular film having a wall of greater thickness than that of the finished tube, locating a former having a maximum diameter within said tube adjacent to the point of extrusion, said former having an outer face, the diameter of said former being substantially greater than that of said film at the point of extrusion, said extruded film being of smaller diameter than the former below said center line thereof, at least part of the freeze zone of said film being between the plane of maximum diameter of said former and the downstream end thereof, directing a high velocity stream of air against the inner face of said film at said former at a velocity at least as high as the point of resonance at said freeze zone and at a pressure sufficiently low to prevent the air from substantially expanding the diameter of the extruding tube between the former and the extruder and to provide a skin of air of such thickness that it is sufficient to prevent actual contact between said film and said former, increasing the diameter of said tube by drawing said tube over the former, maintaining a controlled pressure at said downstream side of said former to maintain said film in a stabilized tubular form, and cooling said tube by said air at said maximum diameter sufficiently to locate said freeze zone between said diameter and said end.

7. A method according to claim 6 characterized in that a second stream of air of large volume is directed against the outer surface of said film onto a circumferential area of said tube, said stream providing additional cooling of said tube.

8. A method according to claim 6 wherein said tube is stretched between said extrusion and said former prior to the setting of said plastic.

9. A method according to claim 6 wherein said air is extracted under the influence of a pumping means.

10. A method according to claim 6 wherein the maximum diameter of said former is varied during operation of said method whereby corresponding variation in the diameter of said tube is obtained.

11. A method of forming an extruded tube of plastic material which comprises extruding said material while in a semi-molten state as a tubular film having a wall of greater thickness than that of the finished tube, locating a former having a maximum diameter within said tube adjacent to the point of extrusion, said former having an outer face, the diameter of said former being substantially greater than that of said film at the point of extrusion, said extruded film being of smaller diameter than the former below said center line thereof, at least part of the freeze zone of said film being between the plane of maximum diameter of said former and the downstream end thereof, directing a high velocity stream of air against the inner face of said film at said former at a velocity at least as high as the point of resonance at said freeze zone and at a pressure sufficiently low to prevent the air from substantially expanding the diameter of the extruding tube between the former and the extruder and to provide a skin of air of such thickness that it is sufficient to prevent actual contact between said film and said former, increasing the diameter of said tube by drawing said tube over the former, positively extracting air out of the downstream side at a rate equal to the rate of supply of said air into said freeze zone, maintaining a controlled pressure at said downstream side of said former to maintain said film in a stabilized tubular form, and cooling said tube by said air at said maximum diameter sufficiently to locate said freeze zone between said diameter and said end.

12. A method according to claim 11 characterized in that a second stream of air of large volume is directed against the outer surface of said film onto a circumferential area of said tube, said stream providing additional cooling of said tube.

13. A method according to claim 11 wherein said tube is stretched between said extrusion and said former prior to the setting of said plastic.

14. A method according to claim 11 wherein said air is extracted under the influence of said pumping means.

15. A method according to claim 11 wherein the maximum diameter of said former is varied during operation of said method whereby corresponding variation in the diameter of said tube is obtained.

* * * * *

PO-1050
(5/69)
Our Ref:
WIL-348C

UNITED STATES PATENT OFFICE
CERTIFICATE OF CORRECTION

Patent No. 3,714,309                    Dated January 30, 1973

Inventor(s)  BERNARD KEITH BIGLAND

It is certified that error appears in the above-identified patent and that said Letters Patent are hereby corrected as shown below:

Inventor: BERNARD KEITH BIGLAND

Signed and sealed this 29th day of May 1973.

(SEAL)
Attest:

EDWARD M. FLETCHER, JR.            ROBERT GOTTSCHALK
Attesting Officer                 CCommissioner of Patents